United States Patent

Vogel

[11] 4,196,641
[45] Apr. 8, 1980

[54] TANDEM-BELT VARIABLE-SPEED TRANSMISSION

[76] Inventor: Hilmar Vogel, Gartenstr. 1E, 8033 Krailling, Fed. Rep. of Germany

[21] Appl. No.: 922,577

[22] Filed: Jul. 6, 1978

[30] Foreign Application Priority Data

Aug. 1, 1977 [DE] Fed. Rep. of Germany ....... 2734630

[51] Int. Cl.² ............................................. F16H 55/52
[52] U.S. Cl. .................... 74/230.17 M; 74/230.17 A; 74/230.17 D; 74/230.17 P
[58] Field of Search ............... 74/230.17 A, 230.17 R, 74/230.17 E, 230.17 M, 230.17 P, 230.17 D

[56] References Cited

U.S. PATENT DOCUMENTS

| 1,819,227 | 8/1931 | Chorlton | 74/230.17 A |
|---|---|---|---|
| 2,805,583 | 9/1957 | Besel | 74/230.17 A |
| 2,952,167 | 9/1960 | Nelson | 74/230.17 A |
| 3,044,315 | 7/1962 | Duhamel | 74/230.17 C |
| 3,088,326 | 5/1963 | Woodward, Jr. | 74/230.17 A |
| 3,365,967 | 1/1968 | Moogk | 74/230.17 A |
| 3,699,827 | 10/1972 | Vogel | 74/230.17 C |

FOREIGN PATENT DOCUMENTS

| 890739 | 9/1953 | Fed. Rep. of Germany | 74/230.17 M |
|---|---|---|---|
| 953930 | 12/1956 | Fed. Rep. of Germany | |
| 1909887 | 9/1970 | Fed. Rep. of Germany | 74/230.17 C |
| 2012732 | 12/1972 | Fed. Rep. of Germany | |
| 2263229 | 6/1974 | Fed. Rep. of Germany | 74/230.17 A |
| 364596 | 11/1938 | Italy | 74/230.17 D |
| 570200 | 12/1957 | Italy | 74/230.17 R |
| 83632 | 3/1954 | Norway | 74/230.17 D |
| 252417 | 10/1948 | Switzerland | 74/230.17 A |
| 926122 | 5/1963 | United Kingdom | 74/230.17 R |

*Primary Examiner*—Leslie Braun
*Attorney, Agent, or Firm*—Karl F. Ross

[57] ABSTRACT

A tandem-belt variable-speed transmission has a pair of shafts each provided with a pair of outer disks flanking an intermediate disk forming therewith a pair of nips each receiving a respective belt. One of each of the outer disks is fixed on the shaft and the other outer disk is axially displaceable on the shaft. The intermediate disk of each pulley is rotationally coupled to one of the respective outer disks and is axially displaceable relative to both disks. An adjustment member is rotationally fixed but axially shiftable on one of the shafts and is connected via a link to the movable disk of the other shaft for varying the pitch of the pulleys. A pressure element and a formation on the movable member of the one shaft and on the adjustment member rotationally couple this movable member to the one shaft.

11 Claims, 5 Drawing Figures

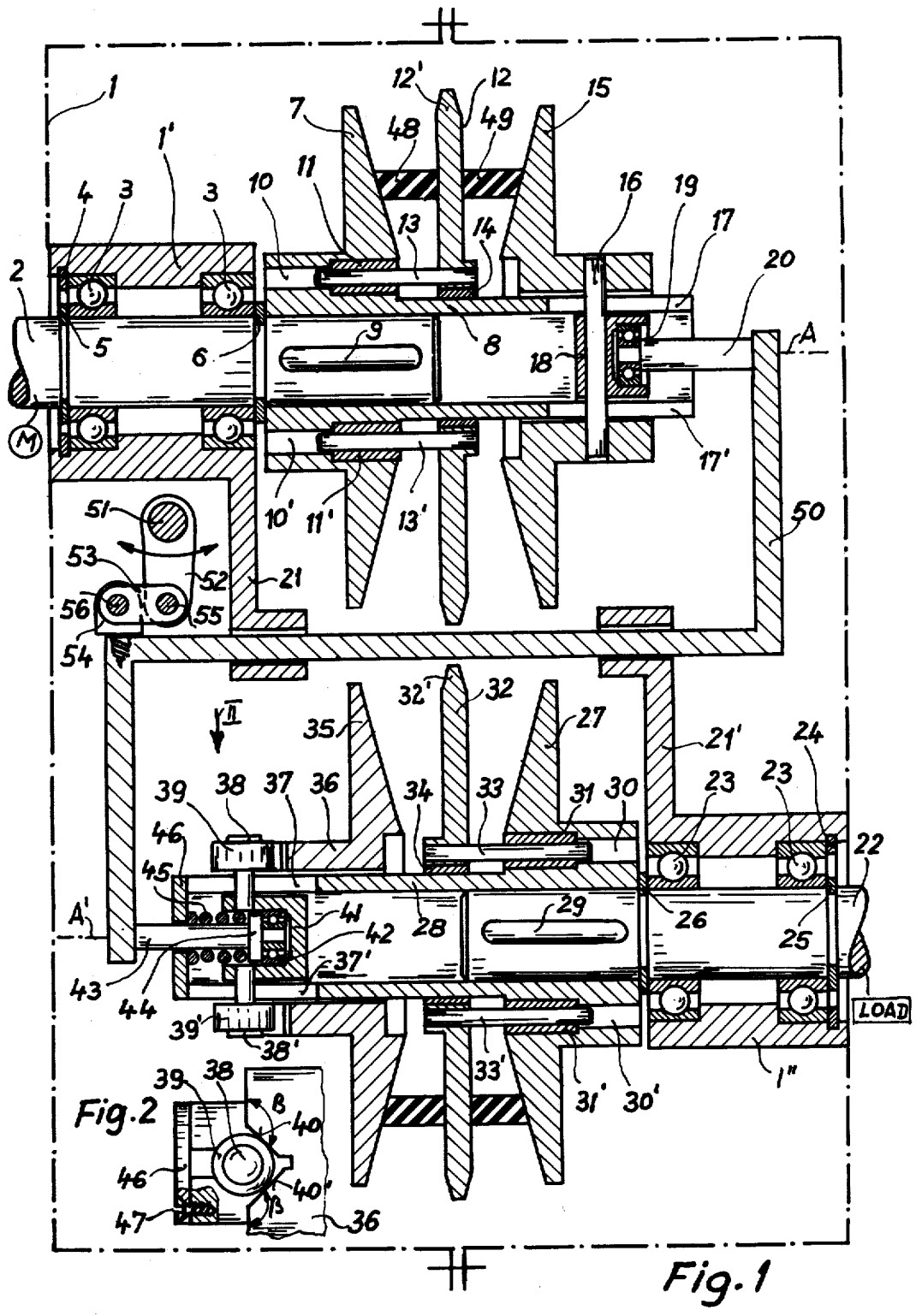

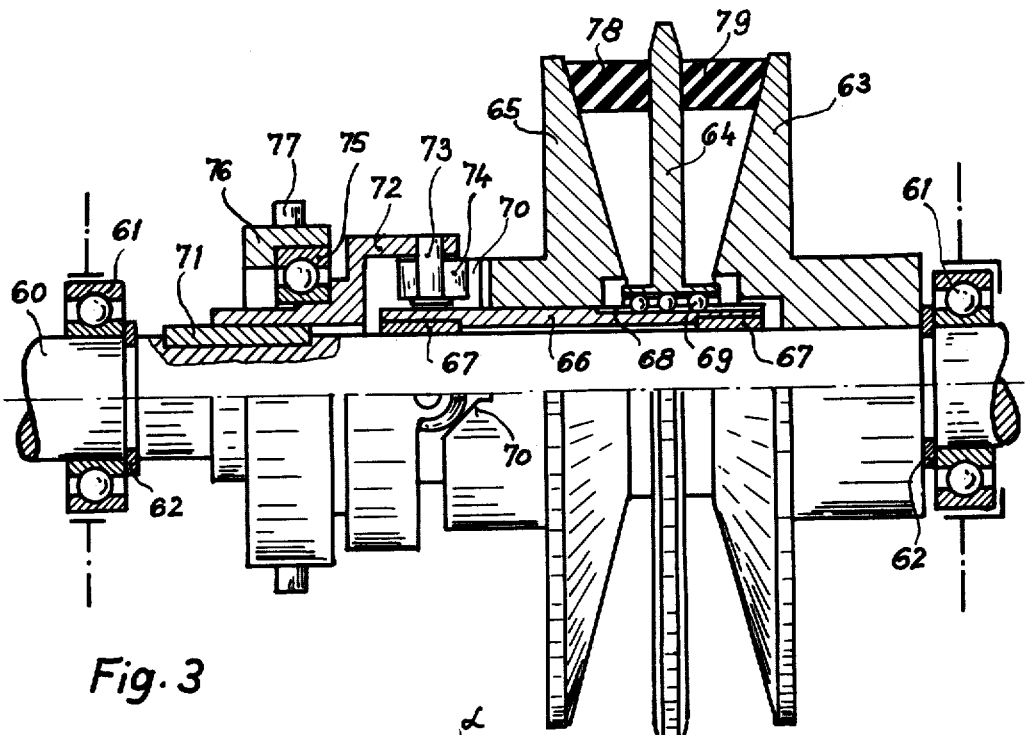
Fig. 3
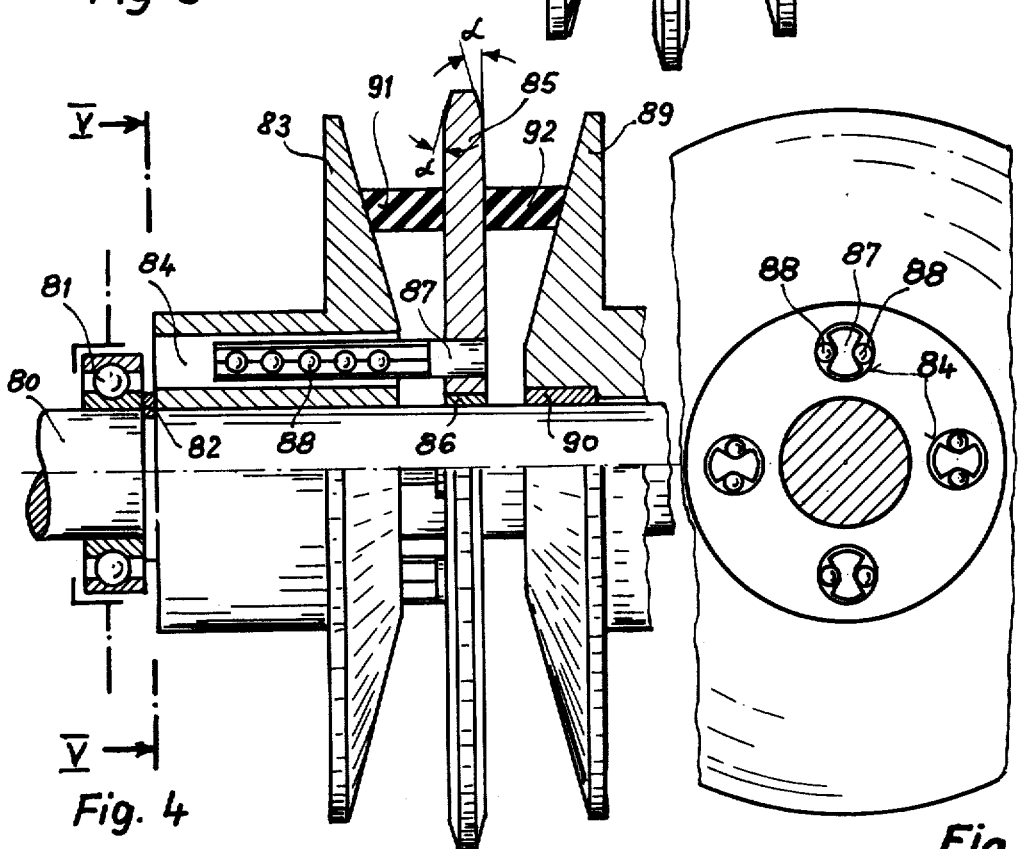
Fig. 4
Fig. 5

TANDEM-BELT VARIABLE-SPEED TRANSMISSION

FIELD OF THE INVENTION

The present invention relates to a steplessly variable transmission. More particularly this invention concerns such a transmission incorporating a tandem V-belt drive.

BACKGROUND OF THE INVENTION

Steplessly variable transmissions are known incorporating V-belt drives, and having variable-pitch pulleys, such as described in my U.S. Pat. Nos. 3,699,827 and 4,026,161. These transmissions incorporate means for pressing the two disks of flanges of the pulleys together with a force dependent on the torque transmitted between the two of them by the flexible member constituted as a V-belt.

It is also known, as the example of the German patent publication Nos. 1,909,887 and 2,012,732 as well as from U.S. Pat. No. 3,044,315 to use tandem belts in such a variable-speed transmission. To this end each of the pulleys or sheaves is constituted by a pair of flanges or disks one of which is movable relative to the other, and by an intermediate disk placed between them. The intermediate disk forms with each of the outer disks a respective nip and the tandem belts are seated in these nips. Such a system is used to transmit considerably greater torque than can normally be transmitted by a single-belt transmission.

The main difficulty with these tandem-belt arrangements is that they are relatively complex. The various disks of the pulleys must be rotationally coupled together, yet able to move axially relative to each other with a high degree of freedom. At the same time the torque-responsive mechanism must be able to operate acurately on both of the belts, normally through the intermediary of one of the disks. A particular problem with such an arrangement is that the intermediate disk becomes fixed relative to one of the outer disks thereby eliminating the variability of the transmission. This typically occurs when the complex guiding structure for the intermediate disk on the outer disks rusts or becomes foul.

OBJECTS OF THE INVENTION

It is therefore an object of the present invention to provide an improved variable-speed transmission.

Another object is the provision of such a transmission which can use tandem belts and is of substantially simpler construction and longer service life than the prior-art transmission.

SUMMARY OF THE INVENTION

These objects are attained according to the instant invention in a variable-speed transmission wherein drive and driven pulleys are carried on respective drive and driven shafts and each have a pair of outer disks flanking an intermediate disk. One of each of the outer disks is fixed rotationally and axially on the respective shaft and the other outer disk is axially displaceable on the respective shaft. The intermediate disk forms with two outer disks a pair of nips and is rotationally coupled with one of the outer disks so that this intermediate disk can be displaced axially relative to both of the respective outer disks. A pair of flexible and endless force-transmitting members are reeved over the pulleys at the nips thereof. An adjustment member is rotationally fixed but axially shiftable on one of the shafts adjacent the respective movable disk whereas the movable disk of the other shaft is rotationally fixed on its shaft. Means is provided including a link connected between this adjustment member and the movable disk of the other shaft for axially oppositely and synchronously displacing the two other disks. Finally means is provided including a pressure element and a formation on the movable member of the one shaft and on the adjustment member for bearing on this movable member of the one shaft with a force related to the torque transmitted by the flexible members between the shafts. The pressure element and the formation rotationally couple the adjustment member to the movable disk of the one shaft.

With the system, therefore, the intermediate disk is guided on only one of the outer disks so as to minimize the potentially troublesome structure rotationally coupling the intermediate disk to both outer disks. The one movable disk is rotationally coupled to the respective shaft only through the torque-responsive belt-tightening mechanism. When the intermediate disk is rotationally coupled to the movable outer disk in turn connected to the torque-responsive mechanism, three-quarters of the angular force in the pulley is transformed into axial force. On the other hand, when the intermediate disk is rotationally linked to the fixed outer disk only one-quarter of the angular forces in the respective pulley are effective on the torque-responsive mechanism. This gives the user the possibility to select the type of force-transmitting member in accordance with its frictional characteristics for the application. When elastomeric or rubber V-belts are used having a relatively high coefficient of friction, an arrangement is used where only one-quarter of the angular forces are transformed into axial forces. This allows one to use relatively light torque-responsive mechanisms, thereby once again decreasing construction cost and also decreasing the likehood of parts failure.

The endless force-transmitting members may be asymmetrical V-belts, round belts, flat belts, cables, chains, or the like. When an asymetrical V-belt is used the axial forces can easily be balanced with each of the pulleys by making these V-belts of right-trapezoidal section, with the perpendicular side resting against the intermediate disk so that all of the forces at these flanks are effective angularly. When a chain or toothed belt is used the outer frustoconical inwardly directed faces form very small angles with a plane perpendicular to the rotation axis. This minimizes the transmission of the forces to the actuating mechanism.

In accordance with a particular feature of this invention the outer disk to which the intermediate disk is fixed is determined in large part by whether the respective pulley is the driven or drive pulley. According to this invention the one intermediate disk is connected to the respective fixed outer disk and the other intermediate disk to the respective movable outer disk. Thus the system can be set up so that one-quarter of the angular forces are converted into axial forces in one of the pulleys whereas in the other pulley three-quarters are thus converted.

According to yet another feature of this invention each of the intermediate disks is of larger diameter than either of the respective outer disks and has an outer edge portion with frustoconical axially outwardly directed surfaces extending at an angle to the respective axis which is greater than the angle defined by the confronting inner faces of the respective outer disk. Such construction ensures excellent centering and guiding of the belt.

BRIEF DESCRIPTION OF THE DRAWING

FIG. 1 is a partly schematic sectional view through a transmission according to this invention;

FIG. 2 is a view taken in the direction of arrow II of FIG. 1;

FIGS. 3 and 4 are sectional views through two other pulleys according to this invention; and FIG. 5 is a section taken along line V—V of FIG. 4.

SPECIFIC DESCRIPTION

As shown in FIG. 1 a transmission according to this invention has a housing 1 having a part 1' carrying a shaft 2 for rotation in bearings 3 about an axis A and having a part 1" carrying a shaft 22 mounted in bearings 23 for rotation about an axis A'. The shaft 2 is held axially in place relative to the housing 1 by means of snap rings 4–6 and similar such rings 24–26 hold the shaft 22 in place. The shaft 2 is operated by a motor M and the shaft 22 is connected to a load.

Each of the shafts 2 and 22 carries a respective fixed pulley half 7 and 27 formed with a tubular axial extension 8 and 28 and secured in place by means of a key 9 and 29. In addition each of the halves 7 and 27 is formed with axially extending bores 10, 10' and 30 and 30' which are fitted with respective slide bushings or sleeves 11, 11' and 31, 31' for pins 13, 13' and 33, 33' of respective intermediate disks 12 and 32. Each such disk 12 and 32 has a pair of planar surfaces perpendicular to the respective axes A and A' and both at outer peripheral regions 12' and 32' extending beyond the corresponding peripheries of the respective pulley halves 7 and 27. The intermediate disks 12 and 32 are slidable via respective bushings 14 and 34 on the respective extensions 8 and 28 of the respective fixed halves 7 and 27.

In addition each pulley has a respective movable pulley half 15 and 35 of substantially identical shape to the respective halves 7 and 27. The movable pulley disk 15 is provided with a collar having a diametrically throughgoing pin 16 passing through axially extending slots 17 and 17' in an adjustment member or block 18 connected via a thrust bearing 19 to a link pin 20 lying on a respective axis A. The pulley half 35 has a collar 36 formed with two pairs of mutually perpendicular surfaces 40 and 40' shown in FIG. 2 and each lying at an angle β of 135° to a plane perpendicular to the respective axis A'. The surfaces 40 and 40' are engaged by rollers 39, 39' carried on diametrically oppositely extending pins 38, 38' seated in another adjustment member or block 41 and extending through slots 37 in the extension 28 of the fixed pulley half 27. Thus the pulley half or disk 35 is rotationally linked by the formations constituted by the surfaces 40 and 40' and the member constituted by the rollers 39 and pins 38 to the pulley half 27. The block 41 in turn is connected via a thrust bearing 42 to a pusher 44 at one end of a link pin 43. A belt-tightening spring 45 is compressed between this pusher 44 and an end plate 46 held over the end of the extension 28 by means of screws 47 shown in FIG. 2. The spring 45 tensions belts 48 and 49 of a right-trapezoidal section spanned between the two pulleys.

A pulley rod 50 extending in guides 21 and 21' of the housing 1 can be axially displaced by a speed-setting rod 51 connected via a crank 52 and a link 53 to a lug 54 on the link rod 50, with pivots 55 and 56 at the ends of the link 53. Displacement of the link 50 in one direction, here to the right, will decrease the pitch of the drive or input pulleys 7, 12, 15 and increase the pitch of the driven or output pulleys 27, 32, 35 and thereby reduce the speed of the output shaft 22 and vice versa. The intermediate disks 12 and 32 can slide very easily so that the displacement of the respective movable disk 15 and 35 will be transmitted readily through them. Furthermore since the belts 48 and 49 are of right-trapezoidal section almost perfect centering of the intermediate disks 12 and 32 is ensured.

The peripheries 12' and 32' of the intermediate disks 12 and 32 extend outwardly beyond the corresponding peripheries of the respective outer disks. The outer faces of these peripheries 12' and 32' are frustoconical and form angles with the respective axes A and A' which are greater than the angles formed by the inner faces of the respective outer disks.

Either or both of the pins 20 and 43 can be axially displaceable relative to the respective link 50 to compensate for the elongation of the belts 48 and 49. To this end one or both of these pins 20 and 43 can be screwed into the link 50 and secured by means of a locknut for occasional adjustment. It is also within the scope of this invention to make the torque-responsive arrangement responsive instead to transmission ratio or speed.

FIG. 3 shows a pulley wherein three-quarters of the angular forces is transformed into axial force on the torque-responsive mechanism. To this end a shaft 60 is rotatably mounted on bearings 61 and axially fixed by means of snap rings 62. The one outer pulley half 63 is axially fixed on the shaft and the other outer disk 65 and a sleeve 66 are axially rotatably mounted on the shaft 60 by means of collars 67. An intermediate disk 64 is coupled via balls 69 riding in grooves 68 of the sleeve 66 to this sleeve 66 and therethrough to the pulley half 65. The pulley half 65 in turn has surfaces 70 corresponding to the surfaces 40 and 40' of FIGS. 1 and 2 which engage rollers 74 carried on pins 73 of a cage 72 mounted via a bearing 75 on an adjustment member 76. A key 71 rotationally links the cage 72 to the shaft 60 so that the formations 70 and the pressure members 74 rotationally link the pulley half 65 to the shaft 60 but the pitch of the pulley is determined by the axial position of the ring 76 connected via the bearing 75 to the cage 72 and operated by means of gudgeons 77. Belts 78 and 79 are engaged in the nips defined between the intermediate disk 64 and each of the outer disks 63 and 65.

In FIGS. 4 and 5 a shaft 80 is mounted in bearings 81 and secured axially by snap rings 82. A fixed pulley half 83 is formed with cylindrical and axially extending bores 84 offset from the shaft 80 and receiving pins 87 extending from an intermediate disk 85 whose rim angle is shown at α. This disk 85 can slide via a bushing 86 on the shaft 80 and the pins 87 are formed with grooves receiving rows of balls 88 allowing easy axial displacement of the disk 85 relative to the disk 83 but good rotational coupling. The other pulley half 89 is rotatable on the shaft and axially displaceable thereon by means of a bushing 90 and belts 91 and 92 engage over the pulley. A torque-responsive or similar actuating mechanism is connected to the pulley half 89.

I claim:

1. A variable-speed transmission comprising:
    drive and driven shafts rotatable about respective parallel axes;

respective drive and driven pulleys on said shafts and each having
- a fixed outer disk rotationally and axially fixed on the respective shaft,
- a movable outer disk axially displaceable on the respective shaft,
- an intermediate disk between the respective outer disks and forming therewith a pair of axially spaced nips, and
- means for rotationally coupling each intermediate disk with only one of the respective outer disks and for allowing relative axial displacement between each intermediate disk and both the respective outer disks;

a pair of flexible endless force-transmitting members reeved over both of said pulleys and each engaged in a respective nip of each of said pulleys;

an adjustment member rotationally fixed but axially shiftable on one of said shafts adjacent the respective movable disk, said movable disk of said other shaft being rotationally fixed thereon;

means including a link connected between said adjustment member and said movable disk of said other shaft for axially oppositely and synchronously displacing same; and means including a pressure element and a formation on said movable disk of said one shaft and on said adjustment member for bearing on said movable disk of said one shaft with a force generally directly proportional to between one-fourth and three-fourths the torque transmitted by said flexible members between said shafts, said pressure element and formation rotationally coupling said adjustment member to said movable disk of said one shaft.

2. The transmission defined in claim 1 wherein said means for coupling includes a plurality of axially projecting pins on each of said intermediate disks offset from the respective axis thereof, each of said one outer disks being formed with axially extending bores receiving the respective pins.

3. The transmission defined in claim 2 wherein each of said pins is formed with at least one axially extending groove, said means for coupling including balls in said grooves engageable between said pins and said one outer disks.

4. The transmission defined in claim 1 wherein said intermediate disks each have an outer frustoconical rim projecting radially beyond the respective outer disks, each outer disk having a face turned toward the respective intermediate disk and forming with the respective axis an angle smaller than that formed between the respective frustoconical rim and the respective axis.

5. The transmission defined in claim 1 wherein said members are belts.

6. The transmission defined in claim 1 wherein each of said intermediate disks are secured rotationally to the respective fixed outer disks.

7. The transmission defined in claim 1 wherein said intermediate disk of said one shaft is fixed to the respective movable disk.

8. The transmission defined in claim 1 wherein said pressure element includes a pin mounted on said adjustment member and a roller on said pin, said formation including an axially open V-shaped seat on the respective movable member.

9. The transmission defined in claim 8 wherein said pin is generally diametral of said adjustment member and said seat has a pair of generally perpendicular faces.

10. The transmission defined in claim 1 wherein each of said fixed disks is provided with an axial extension having an axially extending slot, each of said movable disks being provided with a member engaged in the respective slot and rotationally coupling each of said movable outer disks to the respective fixed outer disk while permitting relative axial displacement therebetween.

11. A variable-speed transmission comprising:
drive and driven shafts rotatable about respective parallel axes;
respective drive and driven pulleys on said shafts and each having
- a fixed outer disk rotationally and axially fixed on the respective shaft and having a frustoconical face,
- a movable outer disk axially displaceable on the respective shaft and having a frustoconical face,
- an intermediate disk between the respective outer disks and having a pair of substantially planar faces forming with the respective frustoconical faces a pair of axially spaced nips, and
- means for rotationally coupling each intermediate disk with only one of the respective outer disks and for allowing relative axial displacement between each intermediate disk and both the respective outer disks;

a pair of flexible endless force-transmitting members reeved over both of said pulleys and respectively engaged in said nips thereof;

an adjustment member rotationally fixed but axially shiftable on one of said shafts adjacent the respective movable disk, said movable disk of said other shaft being rotationally fixed thereon;

means including a link connected between said adjustment member and said movable disk of said other shaft for axially oppositely and synchronously displacing same; and means including a pressure element and a formation on said movable disk of said one shaft and on said adjustment member for bearing on said movable disk of said one shaft with an axial force generally directly proportional to between one-fourth and three-fourths of the torque transmitted by said flexible members between said shafts, said pressure element and formation rotationally coupling said adjustment member to said movable disk of said one shaft.

* * * * *